United States Patent [19]

Schatz

[11] Patent Number: 4,761,956
[45] Date of Patent: Aug. 9, 1988

[54] POSITIVE DISPLACEMENT SUPERCHARGER USING THE EXHAUST GASES OF AN INTERNAL COMBUSTION ENGINE

[76] Inventor: Oskar Schatz, Tellhohe 14, D-8031 Stockdorf, Fed. Rep. of Germany

[21] Appl. No.: 892,871

[22] Filed: Jul. 28, 1986

Related U.S. Application Data

[63] Continuation of Ser. No. 609,917, May 14, 1984, abandoned.

[30] Foreign Application Priority Data

May 18, 1983 [DE] Fed. Rep. of Germany ....... 3318136

[51] Int. Cl.$^4$ ............................................. F02B 37/00
[52] U.S. Cl. .................................................. 60/605.1
[58] Field of Search ........................ 60/597, 598, 605; 417/380, 404; 277/53

[56] References Cited

U.S. PATENT DOCUMENTS 2,878,990  3/1959  Zurcher .............................. 277/53 X
4,211,082  7/1980  Bristol .................................... 60/605

FOREIGN PATENT DOCUMENTS 1403763  1/1969  Fed. Rep. of Germany .
781987   3/1935  France ................................ 60/605
2423637  11/1979 France .
638923   6/1950  United Kingdom .
815494   6/1959  United Kingdom .

Primary Examiner—Michael Koczo
Attorney, Agent, or Firm—Harness, Dickey & Pierce

[57] ABSTRACT

The present invention discloses an exhaust gas supercharger. The supercharger is coupled with an internal combustion engine having a plurality of cylinders. The cylinders produce exhaust gas pulses which drive the supercharger. The supercharger includes a first and second housing each defining a chamber. A first and second partition are movable in the housing chambers. Inlets and outlets are associated with the housing chambers. Exhaust ducts transmit exhaust gases from a first and second set of cylinders to the first housing to drive the first partition. A first and second pair of air ducts are coupled with the second housing to transmit air from the second housing chamber to the first and second set of cylinders. A guide rod connects the first and second partitions together so that they move simultaneously. Also, a biasing element is coupled with the guide rod to move the partitions to a middle position in the housing chambers between exhaust pulses of the first and second set of cylinders.

4 Claims, 3 Drawing Sheets

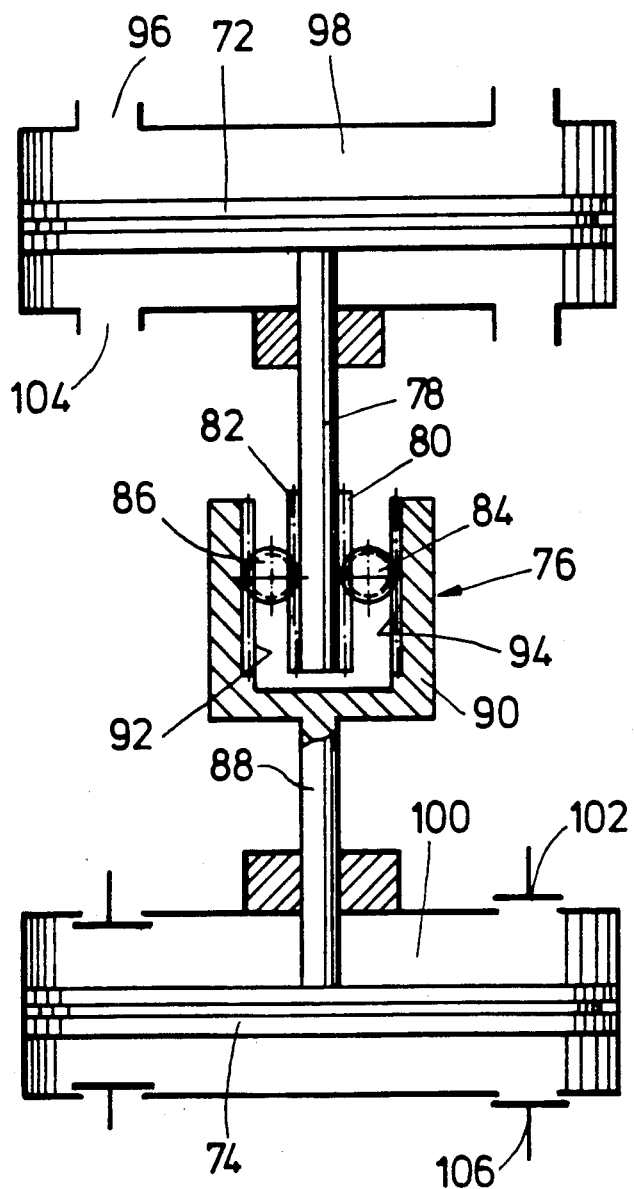

POSITIVE DISPLACEMENT SUPERCHARGER USING THE EXHAUST GASES OF AN INTERNAL COMBUSTION ENGINE

This is a continuation of U.S. patent application Ser. No. 609,917, filed May 15, 1985, now abandoned.

BACKGROUND AND SUMMARY OF THE INVENTION

The invention relates to a positive displacement supercharger for the compression of air using the exhaust gases of an internal combustion engine, and more specifically a piston engine. The supercharger according to this invention has at least one exhaust gas chamber and at least one air chamber, each of said chambers being able to be varied in its volume by way of a moving, chamber partition, said chambers each having an inlet and an outlet.

Positive displacement superchargers driven by exhaust gas are known as a theoretical possibility. However the utilization of the exhaust gas energy periodically leaving one of the engine cylinders poses difficulties in many cases.

In the case of four cylinder engines the exhaust gas pulses mutually hinder each other so that, with an increase in the number of cylinders, there is less and less available energy gradient for driving the partition by means of the natural exhaust gas pulses. A similar effect is to be noted at a high engine speed.

For a number of different methods—more specifically those that have been recently developed—it is beneficial or even unavoidable to use a positive displacement supercharger. For this reason there is a need for general purpose positive displacement superchargers, which may be used for engines having a large number of cylinders or a high rated engine speed.

The object of the present invention is to so develop a positive displacement supercharger of the type described above that may be used for a number of different applications, more specially with engines with a large number of cylinders or a high rated speed for producing novel methods and systems operating to save energy.

In order to effect this purpose the supercharger according to this invention has partitions that are ganged together for joint motion. There is then the possibility of designing the supercharger with exhaust gas chambers that are to be acted upon by exhaust gas in opposite directions, the engine cylinders used for operation of the supercharger by supplying it with exhaust gas being associated in two groups with the two exhaust gas chambers. The outcome of this design is that the frequency of the pressure pulse taking effect in one exhaust gas chamber is halved and the available energy gradient is correspondingly improved, more specially as regards the utilization of the high energy natural exhaust pulses of IC engines. In keeping with one specially useful form of the invention, the supercharger has two exhaust gas chambers, that are placed on the two sides of a partition and two air chambers which are placed on two sides of another partition. Then it is possible to be certain of a very efficient separation of the exhaust gas sections from the air sections.

In keeping with a further useful development of the invention, the partitions are fitted with a guide rod running out of the chambers to a point at which it is guided in the direction of motion of the partitions, the guide play and the guided length being of such a size that a partition designed in the form of a piston may be moved in its chamber without making contact with the chamber walls. Therefore, losses through friction may be kept down to a minimum, more specially seeing that the separation of the exhaust gas chambers from the air chamber or chambers cuts out any danger of a mixing together of the exhaust gas and the supercharged air, if the seal of the chambers on the two sides of the piston is produced by having a suitably narrow clearance between the piston and the chamber inner face next thereto.

The partitions that are ganged together so that they are moved jointly may be linked by mechanical means or their motion may be caused to be in step by way of a synchronizing means.

In keeping with a further useful design, the acting faces of the partition facing into the supercharging air chamber and into the exhaust gas chamber are different in area. If the acting face on the exhaust gas side is larger, then a high supercharging pressure may be produced; if the acting face on the supercharged air side is larger, then a large volumetric air pumping rate will be possible.

In keeping with a further useful development of the invention, two partitions are ganged together for motion in unison by joining them together by way of a means which is adapted to transmit the motion of the one partition to the other one in the opposite direction so that there is a balancing of inertial forces. The device for transmission of motion may be mechanical or hydraulic in its operation.

As part of a specially beneficial further development of the invention, the supercharger has two exhaust gas chambers and two supercharging air chambers, the outlet of the first supercharging air chamber being joined up via a cooler with the inlet of the second supercharging air chamber and having its outlet joined with the inlet of the engine cylinder that is to be supercharged. In this case the air that is firstly compressed may expand and perform work that is absorbed by the supercharger and at the same time the supercharging air cooled by cooling and expansion will improve the engine performance.

In the event of two exhaust gas chambers not being enough for efficient supercharger operation, each exhaust gas outlet may be fitted with a choke, that if desired may be one that is adjustable with respect to the pressure and/or the time of the choking effect to optimize the exhaust gas pulses. For the same purpose it is furthermore possible for the exhaust gas inlet and/or outlet to be fitted with a controlled valve.

A further development of the invention consists in that an exhaust gas collecting means is joined with the exhaust gas inlet on the upstream side thereof and the exhaust gas side of the supercharger is fitted with a pulse generator. This stroke control may be on the basis of an automatic controller, that for example takes into account the operating characteristics and data of the system as a whole. The stroke control on the exhaust gas side of the supercharger may however be triggered by the natural exhaust gas pulses of the engine or by a connection with the engine.

Further useful developments of the invention will be seen from the dependent claims taken in conjunction with the account now to be given.

Using the following account, working examples of the invention to be seen in the figures will now be explained.

BRIEF DESCRIPTION OF THE DRAWINGS

FIG. 3 is a view of a working example of the positive displacement supercharger with an inertia balancing means.

DETAILED DESCRIPTION OF THE INVENTION

Figure 1:
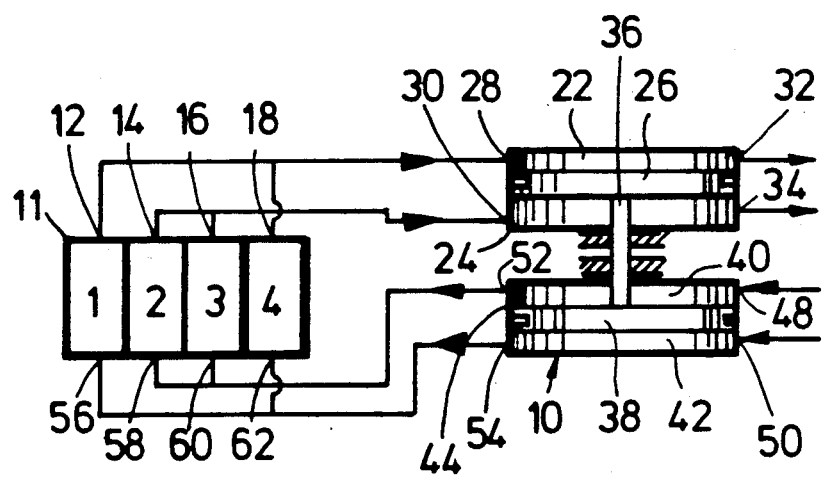
FIG. 1 is a diagrammatic view of a positive displacement supercharger in keeping with the invention in connection with a four cylinder IC piston engine.

In FIG. 1 the reader will see a four cylinder engine 11 functioning as a pulse generator for a positive displacement supercharger 10, the four cylinders 1, 2, 3, and 4 of the engine each having an outlet valve 12, 14, 16 and 18 respectively. If the outlets were to open into a common exhaust pipe, the interaction of the pressure pulses produced thereby might become so pronounced that there would no longer be sufficient energy left over for the operation of the supercharger 10. Therefore the supercharger 10 is designed with two exhaust gas chambers 22 and 24, that are separated from each other by a moving partition 26. Each of the exhaust gas chambers 22 and 24 has an exhaust gas inlet 28 and 30 respectively and an exhaust gas outlet 32 and 34. The outlet valves 12, 14, 16 and 18 are placed in pairs for use with the two exhaust gas chambers 22 and 24, namely in such a way that the outlet valves 12 and 18 are used with the exhaust gas chamber 22 and outlet valves 14 and 16 are used with the exhaust gas chamber 24. The partition 26 is joined up with a second partition 38 by way of a piston rod 36 so that there is a sort of double piston, the two partitions moving in the same direction. The piston rod 36 is guided for axial motion.

The supercharging section 44 has the second partition 38 placed in it which separates the supercharging air chambers 40 and 42 (of which there are two in the present working example) from each other. Each supercharging air chamber has a supercharging air inlet 48 and 50 and a supercharging air outlet 52 and 54. The supercharging air outlets so are distributed like the exhaust gas inlets 28 and 30 among the four engine cylinders such that supercharging operation corresponds to two twin cylinder engines, that are made up of the paired cylinders 1 and 4 on the one hand and 2 and 3 on the other.

For reasons of balancing inertia and to equalize ignition intervals between the separate cylinders, in the prior art four stroke engines with four cylinders have been so designed that the pistons of the two outer cylinders 1 and 4 are moved at the same crank angle to the engine crankshaft, whereas the two inner cylinders 2 and 3 are both displaced by 180 degrees from cylinders 1 and 4. For this reason, the outer pistons are moved in the same direction, whereas the inner pistons are moved in exactly the opposite directions. The ignition timing offset between the two inner cylinders 2 and 3, on the one hand, and the two outer cylinders 1 and 4, on the other, amounts to 360 degrees about the cranksahft in each case. As a result, there is an even timing sequence of 180 degrees about the crank axis. If the two outer pistons for example are moving through their bottom dead center (bdc), then at the same time the inner pistons will run through their top dead center (tdc). At this point in time, because of so-called valve overlap, the inlet valve of the one outer cylinder will still be open while the outlet valve of the other outer cylinder has just been opened.

The air displaced from the supercharging air chamber 42 by the momentum of exhaust gas from the cylinder 1 or 4 is supplied back to the cylinders 4 and 1 by way of the inlet valves 62 and 56, whereas the air displaced from the supercharging air chamber 40 by the exhaust pulse from the cylinders 2 or 3 makes its way, via the inlet valves 60 and 58, into the cylinders 3 and 2.

In keeping with these principles in a four cylinder engine, the cylinder whose outlet valve is opened, will pump air by virtue of the exhaust gas pulse into that cylinder whose inlet valve is opened at the same time without any special pulse generator being necessary for this. As a result, direct supercharging of the engine cylinders is possible from the supercharger, i.e. there is compression of the supercharging air during the supply into the engine, preferably towards the end of the suction stroke. In the case of the known so-called supercharging and so-called direct delayed supercharging, the compressed air is firstly displaced into a storage means and flows from it into the engine.

Figure 2:
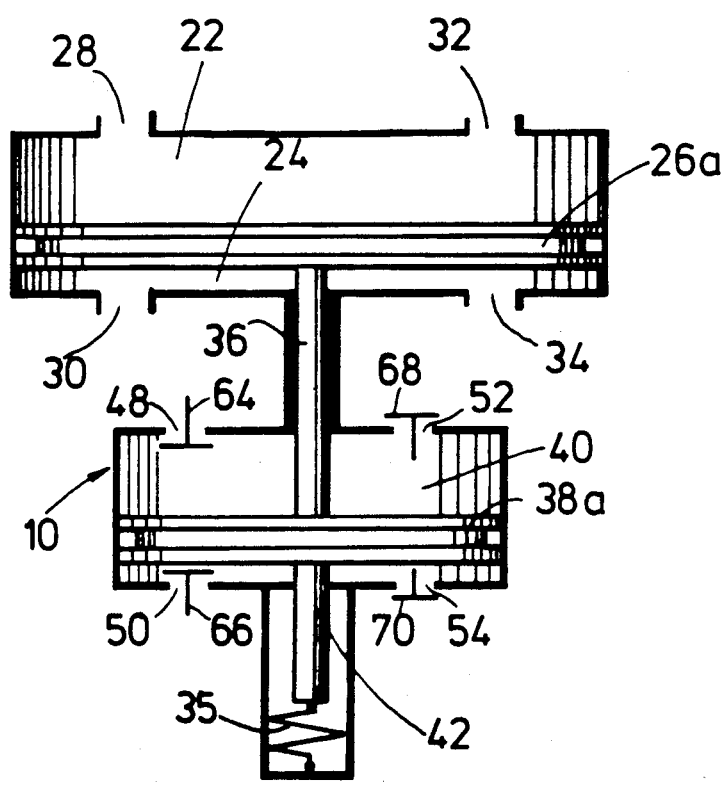
FIG. 2 is a diagrammatic view of a double piston supercharger with piston faces on the exhaust gas side and the air side of different size.

FIG. 2 shows the two piston supercharger 10 somewhat more clearly, while at the same time making clear that by having acting faces of different area of the partitions 26a and 38a, special effects may be produced. In FIG. 2, the partition 26a on the exhaust gas side of the supercharger 10 is larger than the partition 38a on the supercharging air side. The outcome of this is that a high supercharging air pressure may be produced. If the area ratio were to be reversed so that the partition 38a would be larger than the partition 26a, a high volumetric air pumping rate might be produced.

In addition, FIG. 2 shows the check valves 64, 66, on the one hand, and 68 and 70, on the other, which are placed at the supercharging air inlets 48 and 50 and the air outlets 52 and 54, respectively. The spring 35 acting on the guide rod 43 is for example able to be acted upon by tension and compression and in this case has the tendency of keeping the partitions 26a and 38a that are ganged together, in their middle position between the two end positions of the reciprocating motion. The characteristic of the spring 35 is selected in keeping with the purpose in question. More specially, it may have a characteristic that is highly progressive when the two partitions are near their end positions so as to act as a buffer. The check valves 68 and 70 of the two supercharging air outlets 52 and 54 are not mandatory.

FIG. 3 shows a modification in which the two partitions 72 and 74 are not rigidly joined together for moving in step. In fact, the partitions 72 and 74 are joined together by a means, generally referenced 76, for causing them to move in opposite directions to each other so that there is a balancing of inertial forces. The piston rod 78 of the partition 72 is formed with racks 80 and 82 at two opposite sides. Each of teh racks 80 and 82 meshes with a stationary rotating pinion 84 and 86. The piston rod 88 of the partition 74 has a forked end 90, the two facing or inne sides of the fork each having a rack structure 92 and 94, that meshed with the pinions 84 and 86.

If the partition 72 is acted upon by exhaust gas coming through the exhaust inlet 96 of the exhaust gas chamber 98 and moved downwards in terms of FIG. 3, at the same time the partition 74 is moved upwards in the supercharging air chamber 100 to displace the supercharging air through the supercharging air outlet 102. Then acting through the exhaust gas inlet 104 the exhaust gas pulse moves the partition 72 upwards and the partition 74 downwards so that the supercharging air is displaced through the supercharging air outlet 106.

The mechanical means 76 is only shown by way of example and it may as another example be replaced by a hydraulic means for the transmission of motion.

The motion of the partitions that are ganged for motion in step may be influenced by spring elements 35 in FIG. 2 and/or by damping elements acting for example on the connection rod 43 and 36.

This makes it possible for example to produce a preferred resting position in the two end positions of the partitions and/or damping of motion when the partitions get near these end positions. The spring element or elements may be so designed that they cause an automatic adaptation of the supercharging stroke or of the pumped air flow to the load of the engine as represented by the intensity of the exhaust gas pulse.

What is claimed is:

1. An exhaust gas supercharger for an internal combustion engine having a plurality of cylinders which produce exhaust gas pulses comprising;
    a first housing defining a chamber,
    a first partition movable in said first housing defining first and second exhaust chambers each having exhaust gas inlets and outlets,
    a first exhaust duct for transmitting exhaust gases from a first set of cylinders from said engine to said first exhaust chamber through said exhaust gas inlet such that said exhaust gases drive said partition in one direction in said first housing,
    a second exhaust duct for transmitting exhaust gases from a second set of cylinders from said engine to said second exhaust chamber through said exhaust gas inlet such that said exhaust gases drive said partition in an opposite direction from said first partition movement in said first housing,
    a second housing defining a chamber,
    a second partition in said second chamber defining first and second supercharging air chambers each having air inlets and outlets, wherein said first and second partitions have differing cross sectional areas to optimize performance of said supercharger,
    a first air duct for transmitting air from said first supercharging air chamber through said air outlet to a first set of said cylinders,
    a second air duct for transmitting air from said second supercharging air chamber through said air outlet to said second set of cylinders, and
    a guide rod connected to said first and second partitions causing said partitions to move simultaneously whereby exhaust gases produced by one set of cylinders act on said first partition which urges said second partition to force air into the other set of cylinders, and whereby exhaust gases produced by said other set of cylinders act on said first partition which urges said second partition to force air into said first set of cylinders; and
    biasing means associated with said guide rod for moving said partitions to a middle position in said housings between exhausts pulses of said first and second set of cylinders.

2. The exhaust gas supercharger according to claim 1 further comprising means for storing pulses generated in said supercharger air chambers, said storage means associated with said first and second air ducts for transmitting air from said supercharger air chambers to said first and second set of cylinders wherein said storage means stores and enables supercharged air to pass into said first and second set of cylinders.

3. An exhaust gas supercharger for an internal combustion engine having a plurality of cylinders which produce exhaust gas pulses comprising;
    a first housing defining a chamber,
    a first partition movable in said first housing defining first and second exhaust chambers each having exhaust gas inlets and outlets,
    a first exhaust duct for transmitting exhaust gases from a first set of cylinders from said engine to said first exhaust chamber through said exhaust gas inlet such that said exhaust gases drive said partition in one direction in said first housing,
    a second exhaust duct for transmitting exhaust gases from a second set of cylinders from said engine to said second exhaust chamber through said exhaust gas inlet such that said exhaust gases drive said partition in an opposite direction from said first partition movement in said first housing,
    a second housing defining a chamber,
    a second partition in said second chamber defining first and second supercharging air chambers each having air inlets and outlets,
    a first air duct for transmitting air from said first supercharging air chamber through said air outlet to a first set of said cylinders,
    a second air duct for transmitting air from said second supercharging air chamber through said air outlet to said second set of cylinders, and
    guide means connected to said first and second partitions causing said partitions to move simultaneously whereby exhaust gases produced by one set of cylinders act on said first partition which urges said second partition to force air into the other set of cylinders, and whereby exhaust gases produced by said other set of cylinders act on said first partition which urges said second partition to force air into said first set of cylinders, said guide means including a pair of guide rods, each connected to one of said partitions and including a gear drive whereby said guide rods move in opposite directions to thereby balance said supercharger.

4. The exhaust gas supercharger according to claim 3 further comprising means for storing pulses generated in said supercharger air chambers, said storage means associated with said first and second air ducts transmitting air from said supercharger air chambers to said first and second set of cylinders wherein said storage means stores and enables supercharged air to pass into said first and second set of cylinders.

* * * * *